United States Patent [19] [11] 3,852,808
Sadashige [45] Dec. 3, 1974

[54] COLOR AMPLITUDE CORRECTION IN PLURAL TRANSDUCER SIGNAL PLAYBACK SYSTEMS

[75] Inventor: Koichi Sadashige, Berlin, N.J.

[73] Assignee: RCA Corporation, New York, N.Y.

[22] Filed: Sept. 10, 1973

[21] Appl. No.: 395,735

[30] Foreign Application Priority Data

Apr. 4, 1973 Great Britain .................... 16020/73

[52] U.S. Cl. ......................................... 358/8, 358/27

[51] Int. Cl. ............................................ H04n 9/02

[58] Field of Search... 178/5.4 CD, 5.4 AC, 5.4 HE, 178/5.4 TE; 358/10, 8, 27

[56] References Cited

UNITED STATES PATENTS

| | | | |
|---|---|---|---|
| 3,381,083 | 4/1968 | Jensen et al. | 178/5.4 CD |
| 3,541,237 | 11/1970 | Dillenburger | 178/5.4 AC |
| 3,673,320 | 6/1972 | Carnt et al. | 178/5.4 HE |
| 3,716,663 | 2/1973 | Bolger | 178/5.4 AC |
| 3,717,721 | 2/1973 | Makara et al. | 178/5.4 CD |

*Primary Examiner*—Richard Murray
*Attorney, Agent, or Firm*—Eugene M. Whitacre

[57] ABSTRACT

The arrangement corrects color amplitude errors in a video playback system which utilizes a plurality of transducers for recovering recorded information in sequential segmented manner from a record medium. A limited presence color amplitude reference signal segment is utilized to first correct portions of the information recovered by a certain one of the transducers. The first corrected portions are utilized to accomplish correction of further portions of the information recovered from the record medium.

5 Claims, 6 Drawing Figures

| SIG. \ CHANNEL | 1 | 2 | 3 | 4 |
|---|---|---|---|---|
| 4xTW/2 | H | L | H | L |
| 4xTW/4 | H | H | L | L |

COLOR AMPLITUDE CORRECTION IN PLURAL TRANSDUCER SIGNAL PLAYBACK SYSTEMS

The invention relates to apparatus for correcting chroma amplitude variations which are normally encountered in the operation of magnetic tape video recorder-reproducer systems.

Chroma amplitude variations are caused by a variety of reasons, such as non-uniformity of head electrical characteristics, variations in head-to-tape pressure, instability of electronic signal processing circuitry, and variations recorded on the tape medium.

Automatic chroma amplitude correction systems have been known in the art of video tape recording for some time. Typically in such systems the amplitude of the color burst portion of the composite color signal is separated, peak detected and compared against a fixed reference signal. This comparison produces an amplitude error signal which is fed to the control input of an electrically variable equalizer circuit. Thus, the composite video signal, which may be in frequency modulated form, is passed through such equalizer circuit, which modifies it in a manner to restore proper chroma amplitude (saturation level) upon subsequent demodulation. It will be understood that the complete composite video signal may be recorded in frequency modulated form. However, alternatively, the luminance and chrominance portions may be separated, with the luminance portion recorded in frequency modulated (FM) form and the chrominance portion direct recorded. The limitation of this type of system is that its error voltage is derived through the comparison of the peak-to-peak detected color burst and a fixed reference voltage. If the amplitude of the color burst is wrong, the error voltage is therefore wrong and consequently the saturation or chroma amplitude of the output video signal is also erroneous. Unfortunately, it has been found that quite often the amplitude of the color burst signal portion is incorrect, thereby resulting in less than the optimum correction desired for the system.

A new reference signal has been proposed for television studio operations and some video signal transmission applications. The new signal referred to as Vertical Interval Reference signal (VIR) is incorporated in and forms an integral part of the well-known composite color video signal format presently utilized. The VIR signal contains, among other video reference parameters, a reference for chroma amplitude. Since the VIR signal appears only once every television field, it is not desirable to use the VIR signal alone as the reference for a chroma amplitude correction device. The use of the VIR signal portion in conjunction with the color burst portion in a color television receiver for correcting chroma amplitude errors resulting from transmission of the signal to the receiver is discussed, for example, in U.S. Pat. No. 3,679,816.

However, a different and more complex problem is presented in attempting to provide chroma amplitude correction in a color television recorder-playback system, where the video signal must be imparted to and recovered from a record medium in a segmented manner. Typically, in such video recorder-playback systems, a plurality of transducing devices are utilized to sequentially scan the tape recording medium, in order to transduce sequential portions of the video signal. More particularly, quadraplex type video recorder-reproducers are widely used for storing and reproducing high quality video signals which can be used for broadcast purposes. In a quadraplex type system, the video signal is piecewise recorded and reproduced by four separate transducing heads which are sequentially scanned over the tape record medium. Thus, each of the scanning heads transduces only a fractional portion of the some 256 lines of a complete television field. Four complete rotations of the head wheel bearing the four transducing heads are required in order to transduce one complete television field. Thus, a color amplitude reference which appears during only one line of every complete television field will be present during the scan of only one of the four transducing heads, and further, only once every four rotations of the head wheel. This presents a unique problem of color amplitude correction not before recognized nor solved in the prior art.

Disclosed herein is a color amplitude correction scheme which utilizes both the color burst portion and a Vertical Interval Reference signal type portion, for correcting a complete composite color video signal which is recorded and recovered in segmented manner.

Briefly, in accordance with the invention, there is provided a system for correcting chroma amplitude errors in a signal recovered from a record medium by sequential scan of a plurality of transducers. The signal includes a color burst portion and a color amplitude reference signal portion. The system has playback circuitry including a device capable of varying its response to the signal in accordance with an error signal. Means provide a first error signal in accordance with a difference of the reference signal portion and a norm. Means are provided for applying the first error signal to the response varying means in the playback circuitry. The burst signal portions as recovered from a given one of the scanning transducers are compared with the burst portions recovered by a further one of the transducers to provide a second error signal. And means are provided for applying the second error signal to the response varying means in the playback circuitry.

The invention will be best understood by a consideration of the following description taken in conjunction with the drawing, in which.

Figure 1:
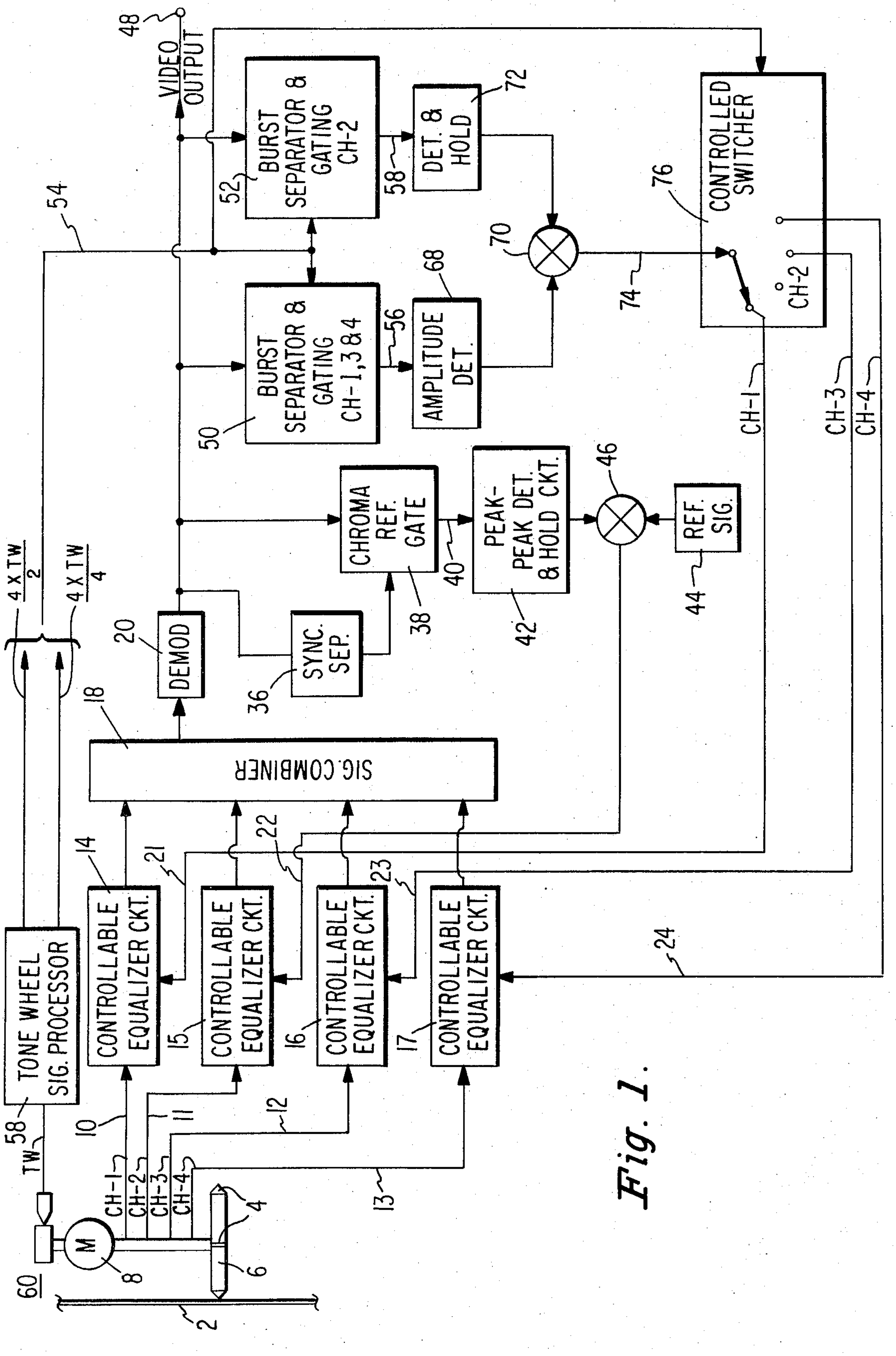
FIG. 1 is a block diagram of a video recorder-reproducer system embodying the invention.
Figures 4, 5:
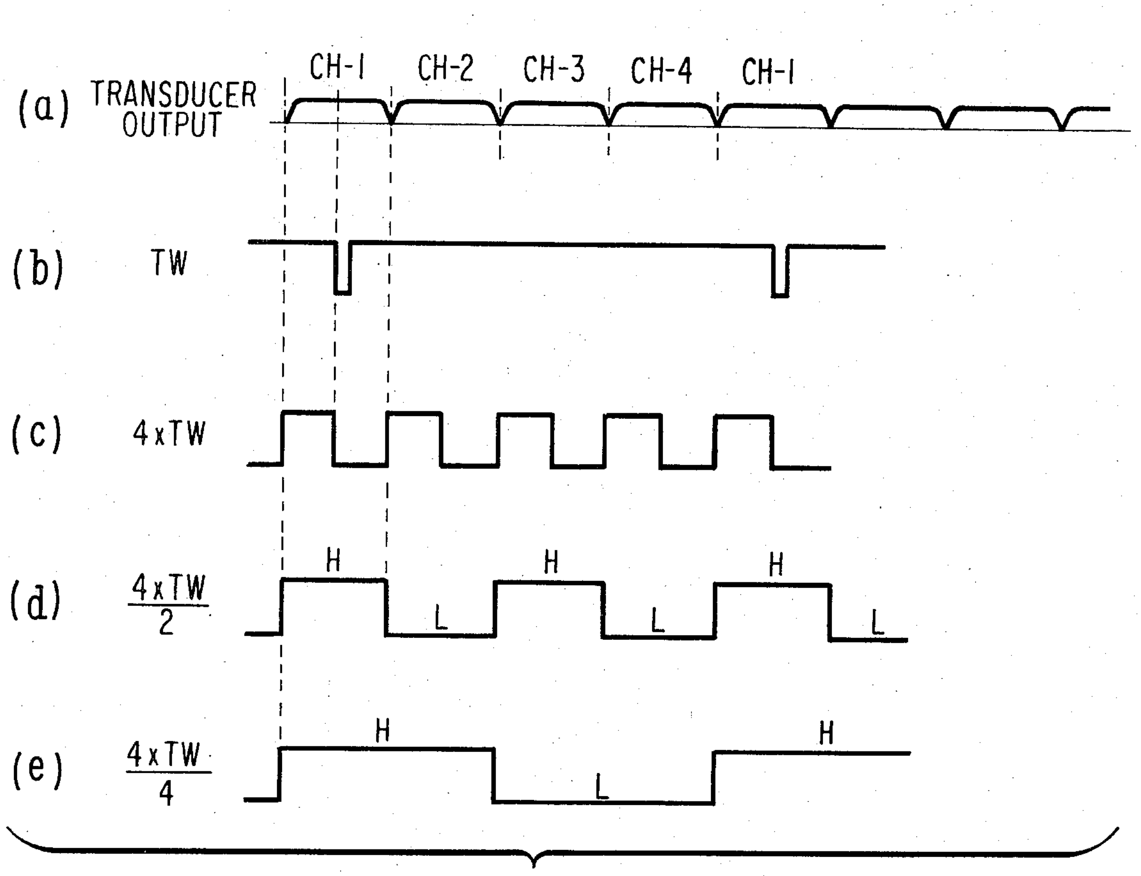
Figure 6:
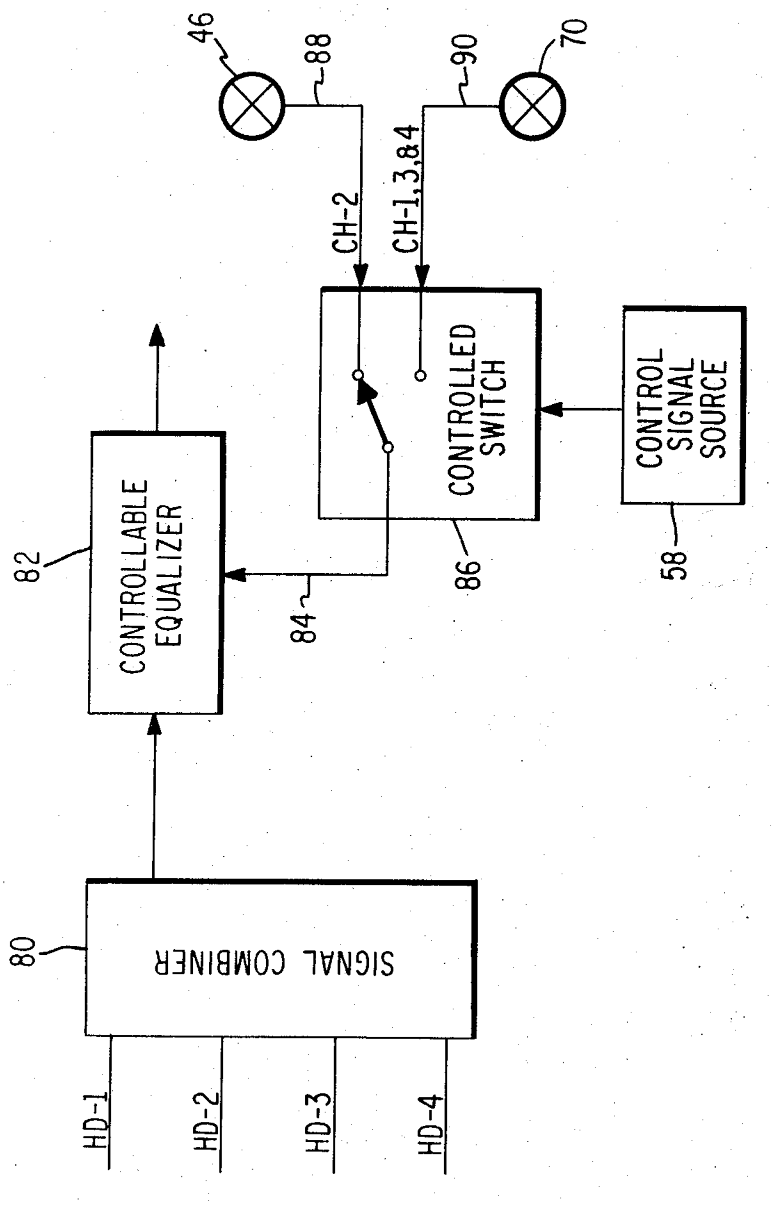

FIG. 4 (*a*)–(*e*) show signals useful in understanding the operation of the system of FIG. 1;

FIG. 5 is a logic table relating certain of the signals shown in FIG. 4; and FIG. 6 is a block diagram of an alternate embodiment of the type of system shown in FIG. 1.

There is shown in FIG. 1, in simplified form, a magnetic tape reproducer system for playing back a composite color television signal from a magnetic tape record medium 2. As indicated, the complete video signal may be in FM form or portions thereof in FM form with the chroma portion direct recorded at baseband frequency preferably with a bias. The video information on the tape 2 is disposed in the well-known format of a sequence of narrow parallel tracks extending across the width of the tape 2. Each of the video information tracks comprises approximately 16 lines of a television field. Each of the tracks is scanned by a different one of four magnetic transducing heads 4. The transducer heads 4 are disposed at 90° intervals about a circular head wheel 6, which is driven in known manner by means such as a motor 8. Thus, during each rotation of the head wheel 6, 64 lines are transduced. Four complete rotations of the head wheel are required to transduce in segmented manner one complete television field.

The signal portions recovered by each of the transducers 4 are removed from the rotating head wheel assembly by known means such as slip rings, not shown. The portions of the signal recovered by the respective transducers 4 appear on leads 10–13, which have been labeled in FIG. 1 as Channels 1–4, respectively. The recovered signal portions on leads 10–13 are passed through respective controllable equalizer circuits 14–17, before being combined by means 18 into a single composite input signal to the demodulator 20.

The circuitry of elements 14–17 and element 18 may take the form of any one of many known embodiments of these elements used in the tape recording art to provide compensation of signals recovered by the transducers. The elements 14–17 may comprise well-known FM equalizer circuits whose amplitude-versus-frequency transfer characteristic is capable of modification as a function of a control signal applied thereto on leads 21–24, respectively. Where the chroma is direct recorded, the equalizer may taken the form of well-known automatic gain control (AGC) circuits in which the gain and hence the amplitude of the chroma signal portion is controlled in accordance with a control input signal. In such an arrangement the separately processed output of the AGC circuit needs no demodulation and is later combined with the demodulated luminance portion to form the composite signal. The signal combiner means 18 may take the form of well-known 4×1 and 2×1 switching arrangements for combining four distinct inputs into a single output. Such signal equalizer circuitry and signal combiner circuitry in the arrangement shown in FIG. 1 are discussed, for example, in U.S. Pat. No. 3,716,663, and therefore need not be discussed further herein.

Figure 2:
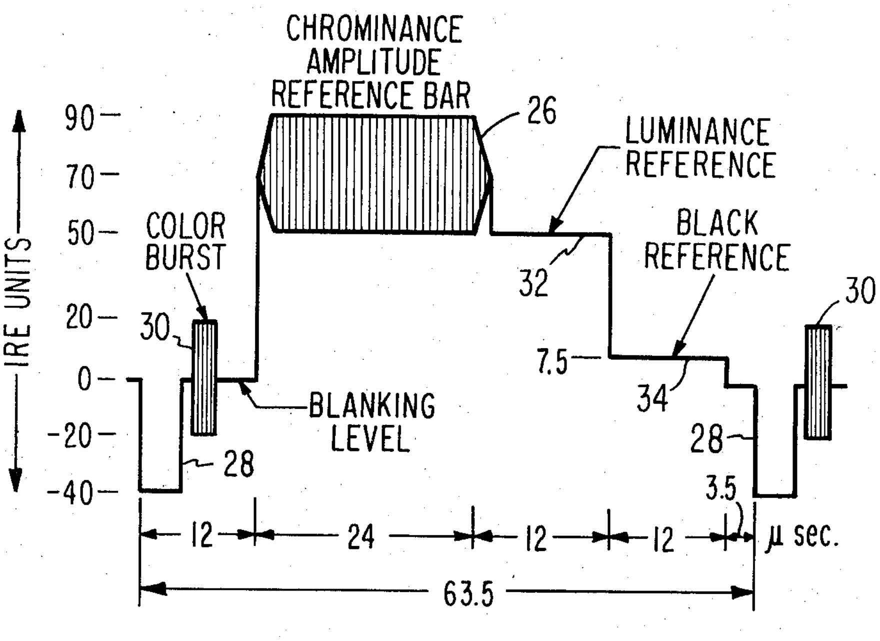
FIG. 2 is a waveform diagram of a composite video signal which includes a chroma amplitude reference portion.

FIG. 2 shows the portion of the composite color video signal output of demodulator 20, which includes the color amplitude references or VIR portion 26 of the composite signal. FIG. 2 illustrates a preferred format for the VIR signal portion inserted into the composite waveform, for example, at line 20 of the vertical blanking interval of a complete television field. As indicated, one particular line of some 256 lines constituting a television field contains in the vertical blanking portion of the signal a subcarrier color amplitude reference portion. Such a reference signal may be of the type proposed by the Broadcast Television Systems (BTS) Committee of the Electronic Industries Association. As shown in FIG. 2, the first 24 microseconds following the backporch of the horizontal synchronizing pulse 28 constitutes a chrominance amplitude reference bar 26 consisting of a chrominance subcarrier of the same phase as the color synchronizing burst 30. The chrominance amplitude reference bar 26, which has an amplitude of 40 IRE units peak to peak set on a pedestal of 70 IRE units, is utilized as hereinafter described in providing color amplitude correction of the signal recovered from the tape medium 2 by the plurality of transducers 4. As also shown in FIG. 2, following the 24 microsecond chrominance reference portion 26, the signal may contain a luminance reference 32 and a black level reference 34. Such Vertical Interval Reference signal (VIR) is more fully described in the BTS Committee report, disclosure of which is herein incorporated by reference.

Returning now to the arrangement of FIG. 1, the synchronizing signal portion of the output demodulator 20 is separated by a sync separator means 36 which may be one of many known types of such circuitry. The output of demodulator 20 is also provided as a first input to a signal gating means 38. A second input to the gating means 38 is provided from the output of the sync separator 36. The second input to the gate means 38 contains time synchronizing information for separating the chroma amplitude reference (VIR) portion 26 of the composite signal, which appears on lead 40 at the output thereof. The peak-to-peak amplitude of the separated reference (VIR) signal portion on lead 40 is detected and the level held by a known type of sampling and hold circuitry 42. The output of means 42 is compared with a source of fixed amplitude reference signal 44 by means of an amplitude type comparator. The amplitude of the reference signal source 44 is made to coincide with a predetermined expected value for the VIR amplitude corresponding to correct performance of the system. Thus, the reference signal from source 44 is used as a norm for comparing the VIR signal portion recovered from the playback system to determine error introduced in the record and playback process. The amplitude difference of error signal from the comparator 46 on lead 22 is provided as the control input to the equalizer circuit 15 through which the Channel 2 video information is processed. The error signal on lead 22 is applied to the equalizer circuit 15 for Channel 2 for the reasons that it is assumed for purposes of this explanation that the chrominance amplitude reference bar 26 of FIG. 2 is present during only line 20 of a given television field. Therefore, as indicated, since each of the transducers 4 processes 16 lines of information, the reference bar 26 appears only in Channel 2.

The application of the controlled input on lead 22 to the means 15 results in the desired correction of that portion of the composite signal which appears at the video output terminal of the system. However, only the Channel 2 portion of the output at terminal 48 has been corrected; therefore, there is need for further correction in the system. It will be understood that the Channel 2 portion, which is corrected in the means 15, includes the color burst portions of the 16 lines of a field which appear in Channel 2. This factor will be utilized, as hereinafter described, to provide correction of the complete video output signal at terminal 48.

The output of demodulator 20, which includes at varying times the burst signal portions appearing in Channels 1–4, is applied to a pair of burst separator and gating circuits 50 and 52. The burst separator circuit portion of the elements 50 and 52 may be any of many prior art circuits usually existing in most prior art color playback systems. The separated burst portions are applied through gating circuitry which may include well-known bistable and logic elements for producing a selected signal at the respective outputs 56 and 58. Passage of selected signal through the gating means of elements 50 and 52 is controlled in accordance with the signals from the tone wheel signal processor 58.

Figure 3:
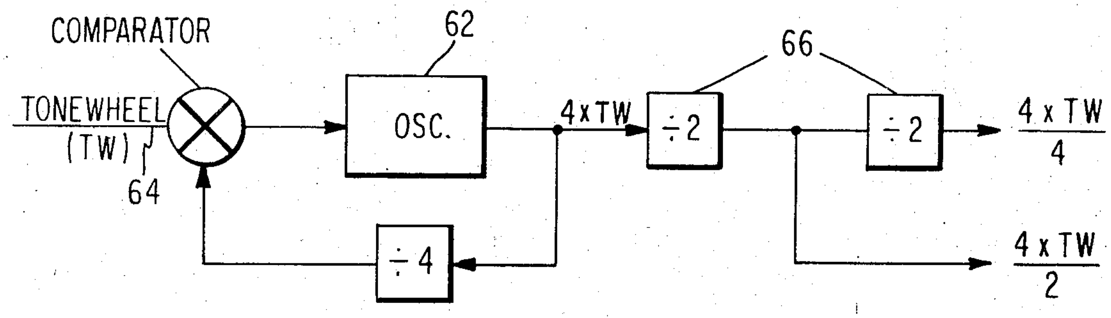
FIG. 3 is a block diagram showing details of a portion of the system of FIG. 1.

As shown in FIG. 1, the head wheel motor 8 also drives a tone wheel assembly 60, which is well-known in the art of tape recording. The tone wheel assembly 60, which may be implemented in magnetic or optical form, produces an output pulse for each complete revolution of the head wheel 6. The tone wheel (TW) signal is applied to the tone wheel signal processor 58. The processor 58, for example, may comprise the circuitry shown in FIG. 3. In the embodiment of the processor shown in FIG. 3, there is provided a frequency controlled feedback loop including an oscillator 62 whose output frequency, by virtue of the servoing operation, provides a signal whose frequency is four times the frequency of the input tone wheel signal on lead 64. A pair of "divide-by-two" frequency divider circuits 66 are utilized to produce separate outputs representing the four times tone wheel signal divided by four, 4×TW/4, as well as a signal representing the four times one wheel signal divided by two, 4×TW/2.

FIG. 4(*a*)–(*e*) show the interrelationships of the various signals of the processor 58 and their relationship to the information portions recovered by each of the four transducers 4 corresponding with the portions in FIG. 4(*a*) labeled Channels 1–4. It is seen from the portions (*d*) and (*e*) of FIG. 4, that the outputs of the processor 58 have various high and low conditions during the time of transducing of each of the Channels 1–4. As is shown clearly by the truth table of FIG. 5, the high and low conditions of the outputs of the processor 58, when taken together, uniquely define the presence of the portions of the video signal corresponding to Channels 1–4. The outputs of the processor 58 are applied, as shown diagramatically by connecting means 54, as control inputs to the elements 50 and 52. Under the control of the signals on means 54, the output of element 52 comprises burst portions of the video signal of Channel 2. Similarly, the output on lead 56 of element 50 constitutes in time sequential arrangement burst portions of Channels 1, 3 and 4.

The amplitude of the burst portions on lead 56 is determined by a detector 68 and fed as a first input to an amplitude comparing device 70. The second input to the comparator 70 is provided from means 72, which detects and holds the amplitude value of the color burst portion corresponding to Channel 2. As indicated, the color burst portion corresponding to Channel 2 has been previously corrected by action of the equalizer circuitry 15. Thus, the comparison in the comparator 70 between the output of element 72 and the output of element 68 for each of the Channels 1, 3 and 4 produces on lead 74 an appropriate color or chroma amplitude correction signal for each of the Channels 1, 3 and 4. It will be understood that appropriate initializing is provided in comparing the various channel burst portions when forming corresponding channel correction signals.

The chroma correction signals for each of the Channels 1, 3 and 4 are fed as input to a controlled switching device, which is shown diagramatically as element 76. The element 76 may be one of many known types of mechanical, electrical or optical switching devices. The switching element 76 is also controlled by the signals on lead 54 from the processor 58. As previously described, the outputs of the processor 58 uniquely define the presence of each of the Channels 1–4. Thus, the means 76 is enabled to provide separate appropriate chroma amplitude correction signals on leads 21, 23 and 24 corresponding to Channels 1, 3 and 4, in a manner synchronized with the operation of the means 50 and 52 described above. It will be noted that no correction signal need be provided from the means 76 for Channel 2, since Channel 2 is corrected, as previously described, by the equalizer circuit 15 in accordance with the signal on lead 22.

FIG. 6 shows an alternative arrangement for the correction circuitry in a tape recorder-reproducer system as shown and described in FIG. 1. In the arrangement of FIG. 6, the signals derived from the four head transducers 4 are combined in element 80. The element 80 may be the same type of signal combining member discussed with respect to FIG. 1. In the arrangement of FIG. 6, a single controllable equalizer or signal parameter modifier circuit 82 is utilized, instead of separate such means for each of the channels preceding the signal combiner. Thus, in the arrangement of FIG. 6, the control circuit 82 is time shared in handling the signals transduced in each of the four head wheel transducer channels. The member 82 includes one of the known types of signal varying circuitry such as an FM equalizer or AGC circuit, depending upon the form of the signal processing utilized in recording.

The control input on lead 84 is provided from a switching device 86 which is under the programmed control of a signal source, such as the tone wheel signal processor 58 of FIG. 1. The inputs to be selected by the switching device 86 appear on leads 88 and 90, respectively. The input on lead 88 is provided from the color amplitude reference signal comparator 46, such as shown and described with respect to FIG. 1. The input on lead 90 is provided from the burst comparator 70 and its associated circuitry, described previously. Thus, the input on lead 88 when coupled to the circuitry 82 establishes an initial correction, including the burst portion of Channel 2. This correction is in accordance with the color amplitude reference signal portion as described with respect to FIG. 1. The input on lead 90, at appropriate points in time, contains the error signal for the color amplitude correction to be provided for Channels 1, 3 and 4. Switching between these inputs is provided at the appropriate times by signals from the member 58, which is capable of indicating when a given channel is recovering a signal from the record medium.

Thus, with the arrangement of FIG. 6, a single signal modifying or equalizing member may be utilized in correcting the complete composite signal recovered by the plurality of transducers. It will be understood, however, that other arrangements are possible, such as utilizing a pair of devices such as the member 82, in which each device corrects two of the signal recovery channels.

What is claimed is:

1. In a system for correcting chroma amplitude errors in a signal recovered from a record medium by sequential scan of a plurality of transducers, wherein the signal includes color burst portions and a color amplitude reference signal portion, said system having playback circuitry including means for varying its response to said signal in accordance with an error signal applied thereto, the combination comprising: means providing a first error signal in accordance with a difference of said reference signal portion and a norm, means applying said first error signal to said response varying means in said playback circuitry, means for comparing said burst signal portions as recovered from a given one of said scanning transducers with that of a further transducer to provide a second error signal, and means for applying said second error signal to said response varying means in said playback circuitry.

2. The invention according to claim 1, in which only a given one of said transducers recovers said reference signal portion, said response varying circuitry includes a plurality of equalizing circuit means, means for applying said first error signal to the one of said equalizing means associated with said given transducer means which recovers said reference signal portion, means for providing said second error signal in accordance with the amplitude difference between a burst portion recovered by said given transducer and a burst portion recovered by a further one of said transducer means, and means for applying said second error signal to the equalizing circuit means for said further transducer.

3. The invention according to claim 1, including means responsive to said recovered signal for separating said reference signal portions, means for detecting the amplitude of said separated reference signal portion, a source of fixed amplitude signal, and means comparing the output amplitude of said detecting means with said fixed amplitude signal to provide said first error signal.

4. The invention according to claim 1, including first means responsive to said recovered signal for detecting the amplitude of the color burst portion recovered by a given one of said transducers, further means responsive to said recovered signal for detecting the amplitude of the color burst portion recovered by at least one other of said transducers, comparing means coupled to said first and further detecting means to provide an output indicative of the amplitude difference between the signals applied thereto, and switching means coupled to said comparing means for providing a selected output to said response varying means.

5. In combination with a playback system having a plurality of transducing means arranged to scan individual information tracks on a record medium to recover a modulated composite color video signal including a plurality of subperiods, each of said tracks containing sub-periods including synchronizing signal portions and burst signal portions, less than all of said tracking containing a sub-period including a color amplitude reference signal portion, apparatus for correcting color amplitude errors in said recovered signal, comprising: separate means coupled to respective ones of said transducers for controllably modifying a signal characteristic as recovered by its associated transducing means, first switching means receiving an input from each of said signal modifying means to provide a combined output thereof, demodulating means coupled to the output of said first switching means, first circuit means coupled to said demodulating means and responsive to said synchronizing portions of said signal to provide said color amplitude reference signal portion, means coupled to said first circuit means and operative to provide a first output in accordance with the amplitude difference of said color amplitude reference and a norm, second and third circuit means including amplitude detecting means coupled to said demodulating means, said second circuit means providing the burst signal portion of said sub-periods in the given information track containing said color amplitude reference signal portion, said third circuit means providing the burst signal portion of said sub-periods of a further information track, amplitude comparing means coupled to output of said second and third circuit means to provide a difference signal therefrom, and means for selectively applying said difference signal as a control input to said signal modifying means.

* * * * *